UNITED STATES PATENT OFFICE.

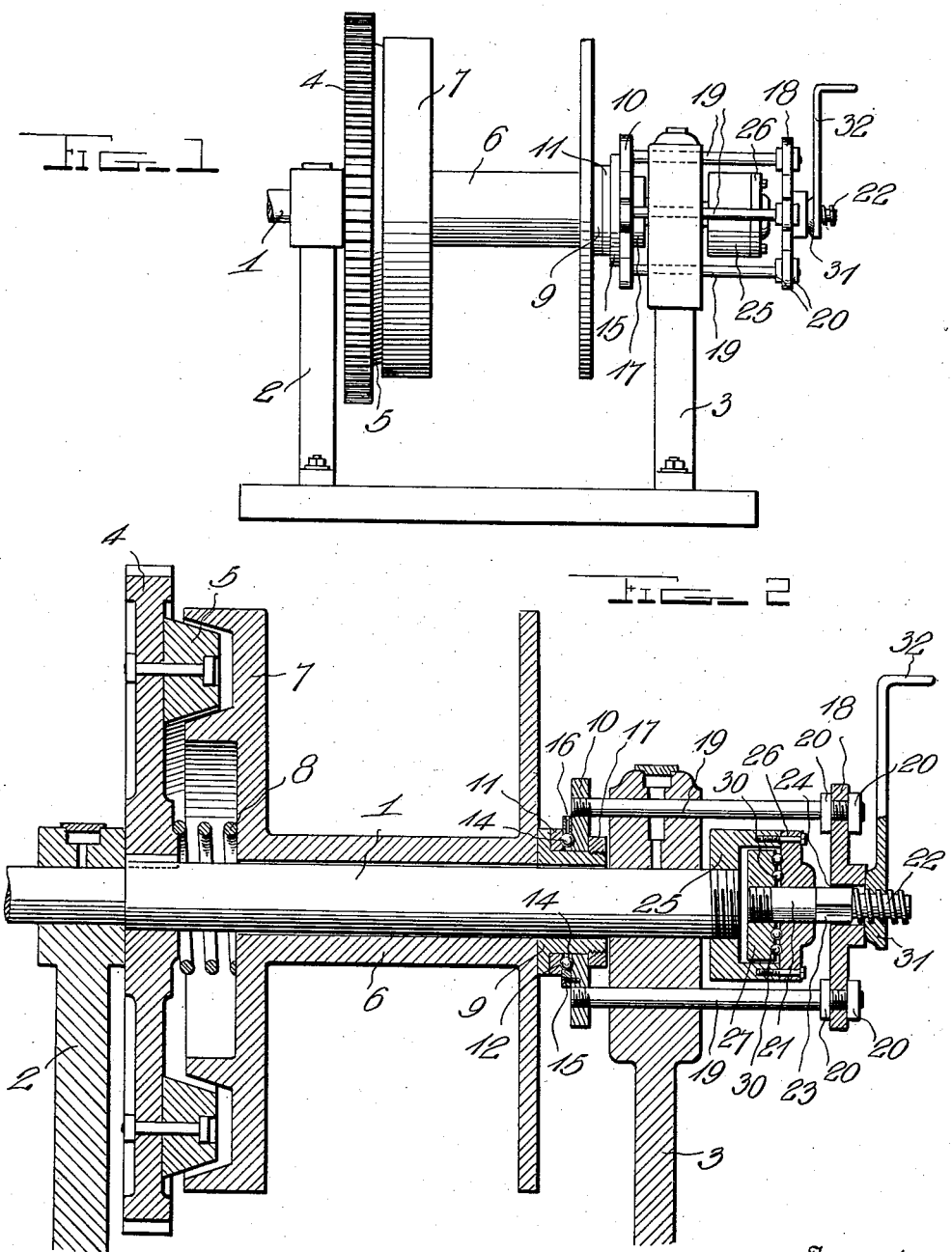

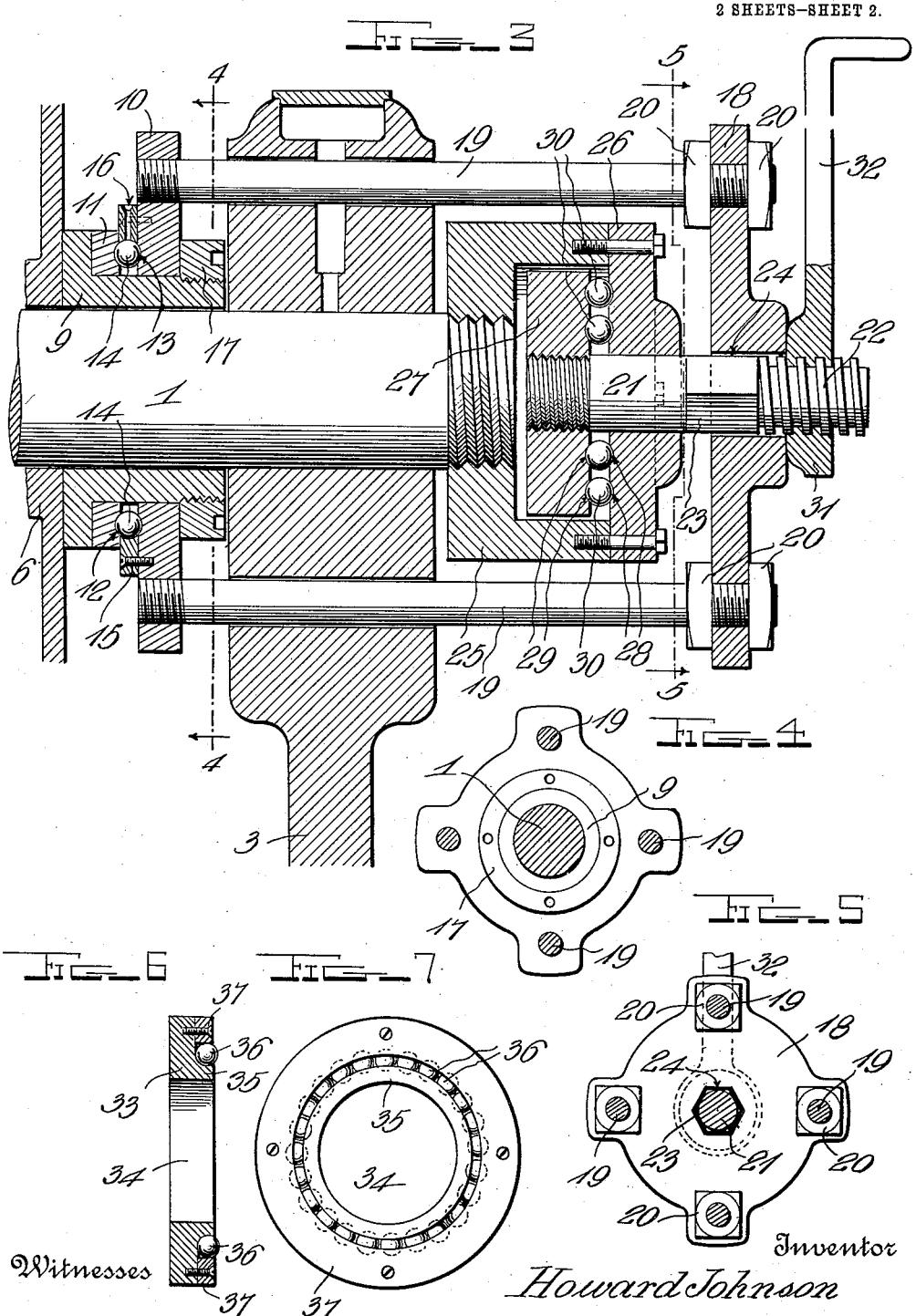

HOWARD JOHNSON, OF LITTELL, WASHINGTON.

FRICTION-CLUTCH.

1,024,006.  Specification of Letters Patent.  Patented Apr. 23, 1912.

Application filed September 21, 1911. Serial No. 650,634.

*To all whom it may concern:*

Be it known that I, HOWARD JOHNSON, a citizen of the United States, residing at Littell, in the county of Lewis and State of Washington, have invented certain new and useful Improvements in Friction-Clutches; and I do declare the following to be a full, clear, and exact description of the invention, such as will enable others skilled in the art to which it appertains to make and use the same.

This invention relates to improvements in friction clutches for the driving mechanism of hoisting or other forms of engines.

One object of the invention is to provide a device of this character which is particularly adapted for use in connection with the cable winding drums of donkey or other hoisting engines whereby said drums may be quickly and easily thrown into and out of gear.

Another object is to provide a clutch which will be simple, strong and durable in construction, efficient and reliable in operation and well adapted to the purpose for which it is designed.

With these and other objects in view the invention consists of certain novel features of construction, and the combination and arrangement of parts as will be more fully described and claimed.

In the accompanying drawings: Figure 1 is a side view of the winding drum and a portion of the driving mechanism of a hoisting engine showing the application of the invention thereto; Fig. 2 is an enlarged central vertical longitudinal section thereof; Fig. 3 is a similar view of the clutch shifting mechanism on a larger scale than that shown in Fig. 2; Fig. 4 is a cross sectional view on the line 4—4 of Fig. 3 showing the construction of the inner thrust plate of the shifting mechanism; Fig. 5 is a similar view on the line 5—5 of Fig. 3 showing the construction of the outer thrust plate of the shifting mechanism; Fig. 6 is a cross sectional view of a modified form of ball bearing between the inner thrust plate and the adjacent side of the winding drum. Fig. 7 is a side or face view of the bearing shown in Fig. 6.

Referring more particularly to the drawings 1 denotes the drum supporting and driving shaft of a hoisting engine, said shaft being revolubly mounted at one end in bearing standards 2 and 3. Keyed to the shaft 1 adjacent to the bearing standard 2 is a driving gear 4, said gear being connected with any suitable power. Bolted or otherwise secured to one side of the gear 4 is one member 5 of a clutch connection between the gear and the drum of the engine. The clutch member 5 is here shown and is preferably in the form of an annular ring the sides of which are tapered toward the outer end of the ring.

Loosely mounted on the shaft 1 between the gear 4 and the bearing standard 3 is a cable winding drum 6 on the end of which adjacent to the gear 4 is formed the other member 7 of the clutch connection for the drum. The clutch member 7 is in the form of concentric annular flanges which are preferably formed integral with the end of the drum and have their inner sides beveled or formed on an angle to correspond with the tapered or angular sides of the clutch member 5 on the gear 4 whereby when said clutch members are brought together a tight frictional contact or engagement will be formed between the same. The clutch members are forced apart and yieldingly held out of engagement by a coiled spring 8 arranged on the shaft 1 between the gear 4 and the end of the drum as shown.

The clutch members 5 and 7 are thrown into operative engagement to lock the drum with the driving gear by a drum shifting mechanism comprising a flanged sleeve 9 which is loosely mounted on the shaft 1 between the bearing standard 3 and the adjacent end of the drum as shown. Loosely mounted on the sleeve 9 is an inner thrust plate 10 between which and the flange on the sleeve 9 is arranged a ball bearing, said bearing comprising an annular plate or ring 11 having in one side an annular groove 12 which forms one member or side of a ball race the opposite side of which is formed by an annular groove 13 in the adjacent side of the thrust plate 10. In the recess formed by the grooves 12 and 13 is arranged a series of bearing balls 14, said balls being held in position by a retaining ring 15 secured to the thrust plate 10 between the same and the plate 11 as shown. In the ring 15 is formed an oil passage 16 whereby lubricating oil may be introduced to the bearing. The outer end of the sleeve 9 is externally threaded and adapted to be screwed thereon is a threaded collar 17 by means of which the plate 10 is secured in position on the sleeve.

Arranged adjacent to the outer side of the bearing standard 3 and operatively connected to the thrust plate 10 is an outer thrust plate 18, said plate 18 being connected to the inner thrust plate 10 by a series of connecting rods or bolts 19 which pass through and have a sliding engagement with the upper portion of the standard 3 as shown. The ends of the rods or bolts 19 are preferably threaded and the inner ends of said rods are screwed into threaded apertures in the plate 10 while the outer ends of the rods pass through the apertures in the plate 18 and have screwed thereon clamping nuts 20 which engage the opposite sides of the plate 18 and securely clamp the same to the rods 19. The rods or bolts 19 engage the thrust plates at diametrically opposite points and where the rods pass through the plates the latter are preferably offset or provided with radially projecting extensions as clearly shown in Figs. 4 and 5 of the drawings.

By connecting the thrust plates together in the manner described it will be seen that said plates will move together or in unison when actuated to shift the drum 6 for the purpose of bringing the members of the clutch into operative engagement. In order to shift the clutch plates and drum to throw the members of the clutch into operative engagement, I provide a suitable clutch shifting mechanism comprising a shifting screw 21 the inner end of which is secured to and has a revoluble connection with the outer end of the shaft 1 and has on its outer end coarse screw threads 22 at the inner end of which the screw for a short distance is of hexagonal or other squared shape as shown at 23, said squared or hexagonal portion 23 of the shaft having a sliding engagement with a similar shaped passage 24 formed through the center of the outer thrust plate 18 as shown. The means for revolubly connecting the inner end of the screw 21 with the outer end of the shaft 1 comprises an annular casing 25 having in its inner side a threaded aperture adapted to receive the threaded end of the shaft 1 whereby said casing may be screwed into engagement with the shaft. Secured to the open outer end of the casing is a cap 26 having formed therein a centrally disposed aperture through which the screw 21 passes. The inner end of the screw 21 when thus engaged with the aperture in the cap 26 projects into the casing 25 and on said projecting inner end of the screw is arranged an annular screw holding plate 27, said plate preferably having a threaded engagement with the inner end of the screw as shown. In the inner side of the cap 26 are formed two concentric grooves 28 and in the adjacent side of the screw holding plate 27 are formed similar grooves 29, said grooves 28 and 29 forming ball races in which are arranged series of bearing balls 30 whereby a ball bearing engagement is provided between the screw holding plate 27 and the cap 26 thus permitting the shaft 1 to freely revolve on the screw 21 which is held against turning by the engagement of the squared or hexagonal portion 23 thereof with the similarly shaped passage in the outer thrust plate 18. With the coarsely threaded outer end of the screw 21 is operatively engaged a shifting nut 31 on which is formed a crank handle or lever 32 whereby said nut may be readily turned.

By constructing and arranging the shifting mechanism of the clutch as herein shown and described it will be seen that in order to shift the drum and thereby bring the members of the clutch connection thereof into operative engagement it is simply necessary to turn the nut 31 in the proper direction on the coarsely threaded end of the screw 21 which, being secured at its inner end to the outer end of the drive shaft 1 and being held against turning by the squared engagement thereof with the thrust plate 18 will cause the nut 21 to screw inwardly on said threaded end of the screw thus engaging the outer thrust plate 18 and forcing the latter together with the inner thrust plate 10 inwardly. In thus shifting the plates inwardly the drum 16 will also be shifted inwardly and the clutch members 7 thereon brought into operative engagement with the clutch member 5 on the gear 4 thus locking the drum in operative engagement with the gear.

In Figs. 6 and 7 is shown a slightly modified construction of the ball bearing connection between the inner thrust plate and the adjacent side of the drum, said connection being shown in this instance as comprising an annular plate 33 having formed therein a centrally disposed aperture 34 through which the shaft 1 passes and having on one side around said aperture an annular laterally projecting flange 35 forming part of a ball race with which are engaged bearing balls 36 said balls being held in place by a ring 37 forming the other part of the ball race, said ring being secured to the plate 33 by screws or other suitable fastening devices. The bearing when thus arranged is adapted to be engaged with the drive shaft 1 between the end of the inner thrust plate 10 and the adjacent end of the drum and when thus arranged the balls 36 will engage the annular ball receiving grooves 13 formed in the adjacent side of the thrust plate. as will be readily understood. The thrust bearing between the drum and the thrust plate 10 shown in the first form of the invention and the bearing shown in Figs. 6 and 7 will effectually resist the thrust of the shifting mechanism when applied to the drum and will relieve all friction between the thrust plate and the drum or the flanged sleeve 9 thus permitting the drum to freely revolve when thrown into engagement with the driving gear 4.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

1. In a device of the character described, the combination with a drive shaft of a driving gear fixedly mounted thereon, a clutch member arranged on said gear, a cable winding drum loosely mounted on said shaft, a clutch member arranged on said drum and adapted to co-act with the clutch member on said gear whereby said gear and drum are locked together in operative engagement, a drum shifting and clutch engaging mechanism, said mechanism comprising slidably mounted thrust plates, a shifting screw, means to loosely connect one end of said screw with the outer end of said shaft, means whereby said screw is held against turning, a shifting nut operatively engaged with the outer end of said screw and with one of said thrust plates whereby when said nut is turned in the proper direction said thrust plates and drum will be shifted and said clutch members brought into operative engagement to lock the drum with said driving gear, and a handle arranged on said nut.

2. In a device of the character described, the combination with a drive shaft of a driving gear fixed thereto a clutch member arranged on said gear, a cable winding drum revolubly mounted on said shaft, a clutch member formed on one end of said drum and adapted to co-act with the clutch member on said gear whereby said drum and gear are operatively connected together, a drum and clutch shifting mechanism, said mechanism comprising inner and outer slidably supported thrust plates, a ball bearing connection between said inner thrust plate and the adjacent side of the drum, a shifting screw, a ball bearing connection between the inner end of said screw and the adjacent end of said drive shaft whereby the screw is held and the shaft permitted to turn freely thereon, said screw having a squared portion adapted to engage said outer thrust plate whereby the screw is held against rotation, coarse threads formed on the outer end of said screw, a shifting nut having an operative engagement with said threaded end of the screw and with said outer thrust plate whereby when said nut is turned in the proper direction said thrust plates and drum will be shifted to bring the clutch members into operative engagement, and means whereby said nut is turned.

3. In a friction clutch and shifting mechanism for cable winding drums, a drive shaft, bearing standards to revolubly support said shaft, a driving gear fixedly mounted on one end of said shaft, a clutch member secured to one side of said gear, a cable winding drum revolubly mounted on said shaft, a clutch member arranged on one end of said drum and adapted to co-act with the clutch member on said gear whereby said drum is locked in operative engagement with the gear, a coiled spring adapted to disengage said clutch members and to normally hold the same out of engagement, a drum and clutch shifting mechanism, said mechanism comprising a flanged sleeve loosely mounted on said shaft adjacent to the outer end of said drum, an inner thrust plate arranged on said sleeve, a ball bearing connection between said plate and the flange on the sleeve, a retaining collar arranged on the outer end of said sleeve to hold said outer plate in position thereon, an outer thrust plate, a series of plate connecting rods slidably engaged with one of said standards whereby said thrust plates are operatively supported and are adapted to move in unison, a shifting screw, means to loosely connect said screw with the adjacent end of said shaft, a shifting nut operatively engaged with the outer end of said screw and with the outer thrust plate whereby when said nut is turned in the proper direction, said plates and drum will be shifted to bring the clutch members into operative engagement thereby locking the drum to said driving gear, and a handle secured to said nut.

4. In a friction clutch and shifting mechanism for cable winding drums, a drive shaft, bearing standards to revolubly support said shaft, a driving gear fixedly mounted on one end of said shaft, a clutch member secured to one side of said gear, a cable winding drum revolubly mounted on said shaft, a clutch member arranged on one end of said drum and adapted to co-act with the clutch member on said gear whereby said drum is locked in operative engagement with the gear, a drum and clutch shifting mechanism, said mechanism comprising inner and outer slidably supported thrust plates, said outer plates having a flat sided passage, a shifting screw, means to loosely connect said screw with the adjacent end of said drive shaft, said means comprising a casing having a threaded engagement with the end of said shaft, an apertured cap secured to said casing and adapted to receive the inner end of the screw holding plate arranged in said casing and having a threaded engagement with the inner end of said screw, a ball bearing connection between said plate and cap, a flat sided surface formed on said screw and adapted to engage the similarly shaped passage formed in the outer thrust plate whereby said screw is held against turning, coarse threads formed on the outer end of said screw, a shifting nut having an operative engagement with said threads and with the adjacent side of the outer thrust plate whereby when said nut is turned in the proper direction, said thrust plates and drum will be shifted to bring said clutch members into operative engagement thereby locking the drum to said gear, and a handle arranged on said nut.

In testimony whereof I have hereunto set my hand in presence of two subscribing witnesses.

HOWARD JOHNSON.

Witnesses:
 WESLEY LLOYD,
 FAYETTE J. PARTRIDGE.

Copies of this patent may be obtained for five cents each, by addressing the "Commissioner of Patents, Washington, D. C."